Dec. 7, 1937.   N. FRANK   2,101,366
CLUTCH DEVICE
Filed Feb. 23, 1935   2 Sheets-Sheet 1
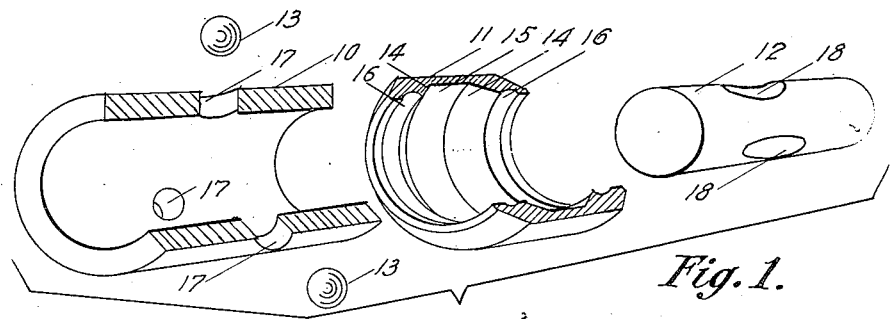
Fig. 1.
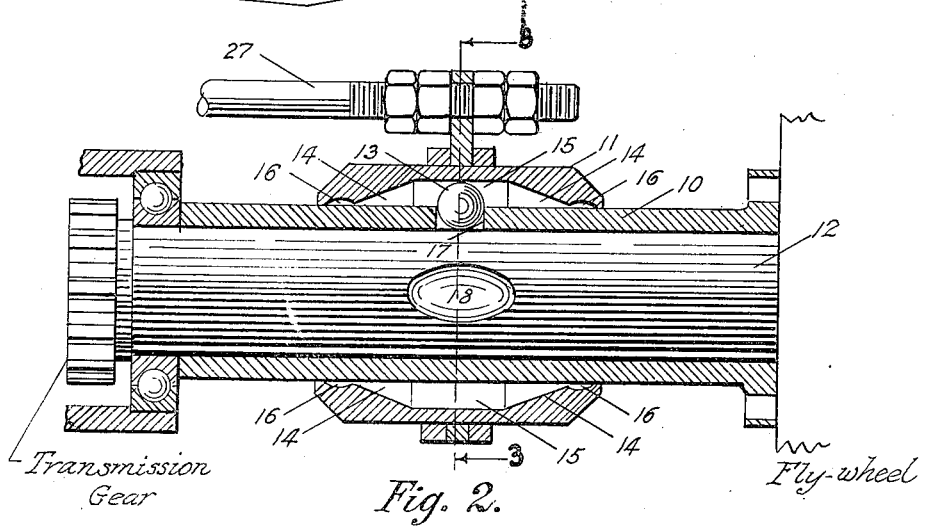
Transmission Gear   Fig. 2.   Fly-wheel
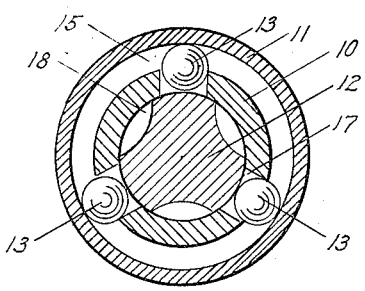
Fig. 3.
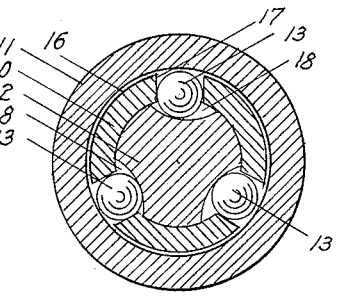
Fig. 4.
Nathan Frank
INVENTOR.
Witness
James F X O'Brien Dec. 7, 1937.  N. FRANK  2,101,366
CLUTCH DEVICE
Filed Feb. 23, 1935  2 Sheets—Sheet 2

Nathan Frank
INVENTOR.

Patented Dec. 7, 1937

2,101,366

UNITED STATES PATENT OFFICE 2,101,366

CLUTCH DEVICE

Nathan Frank, Newark, N. J., assignor to Febod Corporation, Newark, N. J., a corporation of New Jersey Application February 23, 1935, Serial No. 7,723

2 Claims. (Cl. 192—71)

My invention relates broadly to a clutch device or coupling for connecting two otherwise separate parts one or both of which may be working parts, and relates more particularly to a clutch for effecting a smooth, rapid and secure driving connection between a driving member and a driven member such as the power conveying shafts normally used in automobiles, aeroplanes, motor boats, cranes, lathes, and all other machinery and mechanical devices to which a clutch mechanism may be adapted. This clutch type of device may also be used as a simple lock for various mechanisms where it is not desired to have the changeable or clutch type of connection.

The common type of clutches, particularly those used in automobiles at the present time for making and breaking a driving connection between the motor and the transmission gears, consists of discs and drums which are normally held in a frictional operative position by means of springs. Such a clutch is engaged at all times unless the tension of the springs is released through the intermediary of a lever, or in the common automobile, by depressing the clutch foot pedal. Such clutches, due largely to their inherent design and construction, are subject to wear and in many cases are burned out completely necessitating a renewal of parts. The springs and other operative parts of these clutches require frequent adjustments and their loading capacity is definitely limited. Furthermore these clutches do not provide under all conditions the desired smooth and uniform connecting and disconnecting operations. These prior art clutches are, moreover, unilateral in their operation, that is, they are operable only in one direction. Only a few of the clutch parts have been mentioned but as is well known, the common type of prior art clutch for automobiles employs a comparatively large number of parts such as plates, discs, drums, bolts, springs, linings, etc.

In accordance with my invention, I have developed a clutch device that is extremely simple in construction and efficient in operation and is not subject to the various disadvantages and limitations of the prior art clutches examples of which are described just above. My clutch device constitutes not only a marked improvement in clutches from the standpoint of structure but in fact, operates according to entirely new principles fundamentally distinct from any of the prior art devices of which I am aware. The simplicity of structure and ease of installation and operation of my device will, I believe, offer substantial advantages over the prior art devices from the standpoints of economy and efficiency.

More specifically, my clutch device distinguishes from and constitutes an improvement over the commonly used clutches in that it does not utilize frictional contact for effecting the driving connection but instead employs normally floating keys and a movable sleeve which by simple manipulation will firmly, smoothly, and securely lock the driving and driven shafts together and by equally simple operation disconnect these shafts and thereby put them in a non-operative position. My clutch is a bilateral or two-way operative clutch, although it may also be used as a one-way clutch. It is adaptable to various methods and means of operation and when used in an automobile it may be operated by means other than the ordinary foot pedal as will be explained more in detail hereinafter.

An object of my invention is to provide a clutch device that is fundamentally different in structure and function from the commonly used clutches and is not characterized by the disadvantages and limitations of the latter.

Another object of my invention is to provide a simple and efficient clutch adaptable for alternatively effecting a smooth and uniform driving and non-driving connection between concentric driving and driven members, or between concentric shafts or cylinders attached to driving and driven members.

A further object is to provide a compact, inexpensive, bilaterally operative clutch which has no plates, discs, drums, springs, bolts, or linings, which requires no adjustments after installation and which is normally in a disengaged or non-operative position.

A further object of my invention is to provide a clutch employing spherical keys, recesses therefor, and a cooperative sleeve for locking driving and driven shafts smoothly and securely at low or high speeds.

The novel features of my invention are set forth with particularity in the appended claims; the invention itself, however, both as to its organization and method of operation will be easily understood from a consideration of the following more detailed description taken in conjunction with the accompanying drawings in which;

Figure 1 is an exploded view in parallel perspective and partly in cross-section showing the essential elements of my clutch device;

Figure 2 is a longitudinal sectional view of my clutch device and associated mechanism showing one methed of attaching it to the fly-wheel and to the transmission of an automobile;

Figure 3 is a cross-sectional view taken along line 3—3 of Figure 2 showing the clutch device in unlocked position;

Figure 4 is a cross-sectional view of the clutch device of the type shown in Figure 2 when in locked position;

Figures 5, 8:
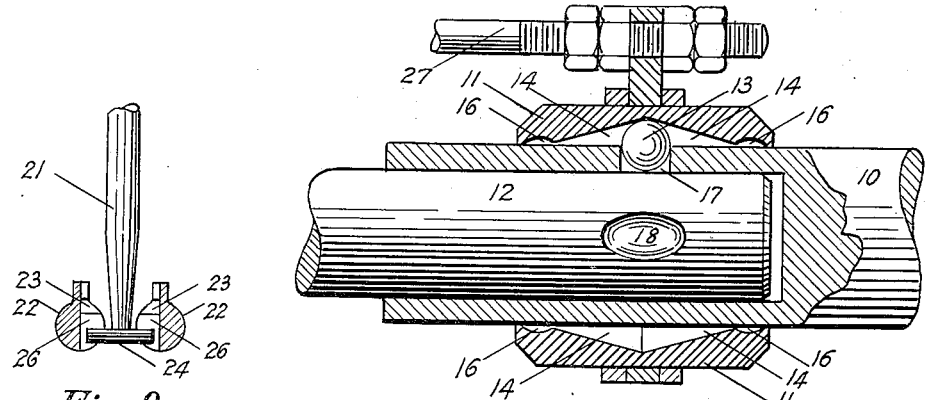
Figure 5 is a longitudinal sectional view showing a modification of the clutch device of Figure 2.
Figure 8 is a detail showing of the gear shifting dogs and escapement slots therefor shown in Figure 7.

Referring now to the drawings and more specifically to Figure 1 thereof, the six parts which constitute all of the necessary members or elements of my clutch device, are shown partly in section and exploded from their normal operative positions, for sake of clearness of understanding. These parts consist of a substantially cylindrical shaped member 10, which may be connected to the driving shaft of an automobile or to the driving member of any other machinery; a coupling or locking sleeve 11, substantially cylindrical in shape and having an inside end diameter slightly larger than the outside diameter of the member 10; a substantially cylindrical shaped member 12 which may be connected to the driven shaft of an automobile or to any other driven member and which has an outside diameter slightly less than the inside diameter of the member 10; and three substantially spherical shaped locking members 13.

By means of the above mentioned differences in diameters of the respective members they may be concentrically arranged in such a manner that the member 10 would constitute the female shaft, the member 12 the male shaft, and the member 11 one of the means for connecting these two shafts together. The other connecting means, which are operatively associated with the sleeve 11 as will be described more in detail hereinafter, are the three balls or spherical shaped members 13.

If it is desired the member 10 may be connected to the driven shaft and the member 11 to the driving shaft, that is, the reverse order to that mentioned above. The members 10 and 12 need not be separate from the driving and driven members to which they are connected but in fact may be integral extensions thereof. The latter arrangement will probably prove to be the preferred one where my clutch device is to be incorporated in new machinery such as automobiles, aeroplanes, motor boats, etc., at their time of manufacture. Where it is desired to adapt my clutch to presently existing machinery the members 10 and 12 would probably be made separate and then securely connected to the driving and driven members respectively by means of bolts or a spline or the like.

While various suitable metals may be used in the manufacture of the different parts of my clutch device, I have found it advantageous to make the driving member or its extension out of bronze metal and the driven member or its extension out of surface hardened tool steel, or the reverse. The connecting sleeve, such as sleeve 11 in Figure 1, may advantageously be made of surface hardened tool steel. All however may be made of other metals or combinations of metals, or hardened metals or combinations thereof.

The interior of the sleeve 11 comprises two similar cone shaped surfaces 14 the bases of which are separated by a chamber 15. This chamber may be cylindrical or barrel shaped or of any other suitable curvature. The width of this chamber may be regulated to accommodate any desired preliminary motion, such as for example, that required for the shifting of gears in an automobile before the clutch is engaged. When a preliminary motion is not necessary, the central chamber 15 may be omitted and the bases of the cones 14 will then coincide, as explained more in detail hereinafter in connection with Figure 5.

Near each end of the sleeve 11 is formed a groove 16 which intersects the conical surface 14. The inner edges of these grooves are spaced outwardly from the driving member an amount slightly greater than the outer edges of the grooves, for facilitating the engagement of the grooves with the balls 13, as will be described. The member 10 has formed in its walls a hole or a plurality of holes 17. These holes 17 permit the balls or other spherically shaped locking members 13 to pass through to the concentric inner driven member 12. This member 12, as shown, has one or a plurality of recesses 18 which correspond to the number of holes 17 and number of locking members 13. In Figure 1 there is shown two of these locking members 13. I have found that three of these locking members produce very satisfactory results, although it is to be understood that any greater or lesser number of locking members, holes, and recesses, may be used to accommodate different adaptations of the clutch of my invention.

The method and means for utilizing my clutch device in an automobile is illustrated in Figure 2 which shows in general a fly-wheel and a transmission gear connected through the intermediary of my clutch. As explained above in connection with Figure 1 this clutch consists of a driving member 10, connected in this case to the fly-wheel, and a driven member 12 connected to one of the gears in the transmission of the automobile. In this figure the clutch is shown in an unlocked position and a cross-section of the same is shown in Figure 3 so that for clearness of understanding these two figures may be considered together in connection with the description just below relative thereto.

When my clutch is in this unlocked position, that is, there is no driving connection established between the members 10 and 12, and the driving member 10 is in motion, the locking members 13 are positioned partly in the chamber 15 and partly in the holes 17 and are riding clear of the member 12, because of the centrifugal force generated by the rotation of the driving member 10. As long as the driving member 10 rotates, the locking members 13 are thus retained in this free riding position by the walls of the holes 17 and rotate with the driving member 10. When the fly-wheel to which the driving member 10 is connected is stopped and the driving member 10 accordingly stops rotating, the locking members 13 may tend to fall into the seats 18 of the member 12. If they should fall into these seats, they will be rolled out immediately upon the renewed rotation of the fly-wheel and driving member 10.

It is thus apparent from the description just above relative to this unlocked condition that although the driving member 10 is rotating while the fly-wheel is rotating, the member 12 normally termed the driven member, is not rotating because there has not yet been formed any driving connection between these two members. In other words the clutch is disengaged unless engagement is effected by some positive action of the type described hereinafter which locks the two driving and driven members. In this respect it is evident that my clutch distinguishes fundamentally from the common type of automobile clutch since the latter is continually engaged unless disengaged by positive action such as the depression of the foot pedal.

To engage my clutch, that is, to form a driving connection therewith by locking the members 10 and 12, the sleeve 11 is given a translating motion in either direction by means of the member 27 attached thereto. This locked condition is illustrated in Figure 4, in which it is shown that the locking members 13 are seated in the recesses 18 which now are lined up with the holes 17. When the sleeve 11 is moved sideways as stated, one of the conical surfaces 14 approaches the location of the holes 17 and due to the decreasing curvature or smaller diameters of this section the locking members 13 are gently forced into the seats 18. When the sleeve 11 is moved as far as it will go in one direction, that is, it reaches the limit of its travel, the spherical locking members 13 will rest in one of the grooves 16. The inner edge of the groove is of greater diameter than the outer edge. This larger diameter facilitates the reception within the groove 16 of the locking members 13 and the smaller diameter at the outer edge of this groove prevents the sleeve 11 from being moved any further in this direction and holds the members 13 in the recesses 18 and thereby effects a firmly locked and driving connection between the driving member 10 and the driven member 12. This locked condition once established is permanently maintained or in any event until the sleeve 11 is moved in the reverse direction to that described just above. When it is moved in this latter direction the locking members 13 will again ride or float partly in the holes 17 and partly in the chamber 15 as described above and the unlocked or disengaged condition will thereby be reestablished.

In Figure 5 there is shown a modification of the clutch device shown in Figure 2 and which distinguishes from the latter by the omission of the chamber 15 shown in Figure 2 and also by the fact that the male member 12 does not extend the full length of the female member 10. This type of clutch, as shown in Figure 5, does not have any so called neutral position for the preliminary motion involved in shifting gears to accommodate various speeds. It is designed, therefore, for operating machinery at one speed such as that commonly used in aeroplanes, motor boats, cranes, etc. The modus operandi for engaging and disengaging this clutch by movement of the sleeve 11 is the same as that described above in connection with Figure 2. Like the clutch in Figure 2 this clutch is also bilaterally operatable so that the sleeve 11 may be moved in either direction for locking the members 10 and 12.

On account of the potential hazards involved it is not common practice to use a clutch in aeroplanes and consequently the propeller must revolve whenever the motor is running. This has disadvantages, of course, when it is desired to inspect or repair the motor while it is running for the revolving propeller hinders the mechanic and his work and oftentimes causes accidental injury to mechanics and observers. In view of the "fool-proof" characteristic of my clutch, especially the permanent locking feature, it is believed that this clutch may be used in airplanes for engaging and disengaging the propeller with the motor without any substantial increase in risk.

Figure 6:
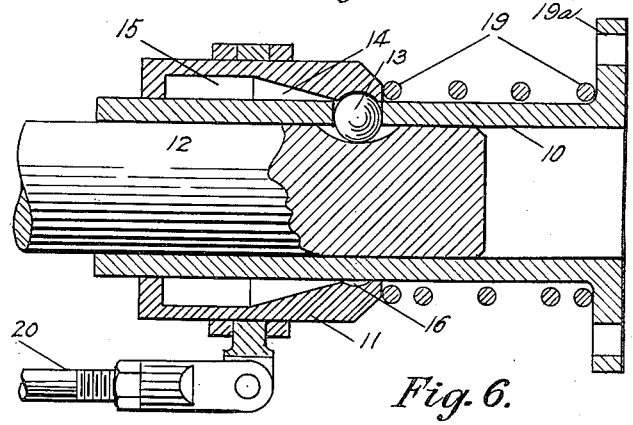
Figure 6 is a longitudinal sectional view showing a modified type of clutch device made in accordance with my invention.

In Figure 6 is shown a further modified type of clutch from those described above, but still employing some of the principal features of my invention. This clutch is designed for replacement of the present day clutches and would be operated in automobiles by the conventional clutch foot pedal although it may be elsewhere used. As shown it comprises the driving member 10 and the driven member 12 but has only one groove 16 and only one conical section 14. It would accordingly be operatable in only one direction and is therefore a unilateral type of clutch as contrasted with the bilateral types described hereinbefore. Like the present day automobile clutches this unilateral clutch is always engaged as indicated by the locked position in Figure 6 unless disengaged by some positive action such as a depression of the foot pedal.

The means for holding the clutch in engagement is the helical spring 19 held under tension between the sleeve 11 and the flange 19a. As indicated the clutch is engaged or disengaged by movement of the sleeve 11 through the intermediary of the connecting rod or shaft 20. This member 20 would in the usual case be connected to the automobile foot pedal in the conventional manner. When the foot pedal is depressed the rod 20 shifts the locking sleeve 11 into the neutral or unlocked position and compresses the helical spring 19. When the foot pedal is released the spring 19 returns the sleeve 11 to the locked position.

Figure 7:
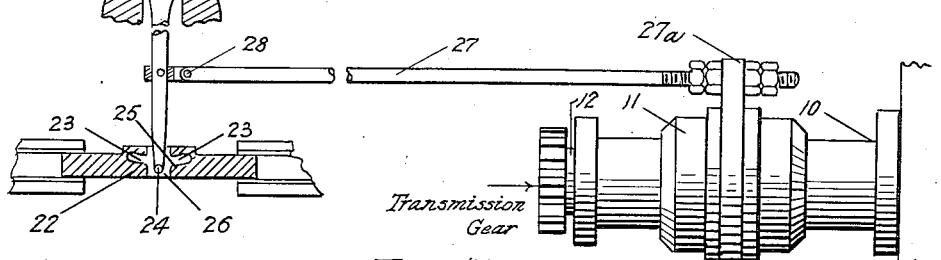
Figure 7 shows one method of operating my clutch device.

Referring now to Figures 7 and 8, there is shown an overall system illustrating one method for operating my clutch device when it is connected in an automobile between the fly-wheel and transmission. In accordance with this method the commonly used clutch foot pedal is eliminated and the clutch is operated by proper manipulation of the gear shift lever. This lever 21 is attached, by means of a knuckle 28, to the rod 27 which is in turn connected to the clutch sleeve 11 by means of a metal band 27a. This band 27a is slidably connected with the sleeve 11 and thereby permits the sleeve to rotate with the driving member 10.

When the lever 21 is pushed either forward or backward, the dog 24 is moved across the space 26 and presses against one wall of the gear shifting dogs 22 and by the time the dog 24 has reached the chamfer 25 the gears are meshed. Now by advancing the lever 21 still further the dog 24 passes the chamfer 25 and goes into one of the escapement slots 23. Coincident with this latter action the rod 27 is moved and the sleeve 11 is shifted into the locked position, described hereinbefore, thereby forming a driving connection between the fly-wheel and the transmission causing the automobile to move forward or backward depending of course upon the "gear" which has been chosen.

The knuckle 28 is provided because of the upward motion imparted to the gear shift lever 21 as the lever dog rises along the edge of the hole 26.

In Figure 8 the lever dog 24 is shown in the neutral position in the holes 26 of the gear shift dogs 22.

My invention is not limited to the specific illustrations given in the accompanying drawing nor to the above description but is susceptible to various modifications and changes the scope of which is to be limited only by the appended claims.

What I claim as new is:—

1. A bilaterally operative automobile clutch device comprising two concentric shafts, a plurality of spherical locking members, a sleeve coupling for effecting alternately a driving and a non-driving connection between said shafts through the intermediary of said locking members, the interior of said sleeve being formed into two conical surfaces the bases of which are separated by a substantially cylindrical shaped section, all of said members being arranged in such cooperative relationship that limited longitudinal movement of said sleeve in either direction effects through the coaction of said conical surfaces with said spherical locking members a driving engagement of said clutch and limited longitudinal movement in the opposite direction effects a disengagement of said clutch and a groove located at the apex of each conical surface adjacent the edges of said sleeve for cooperation with said spherical locking members.

2. A bilaterally operative normally disengaged clutch device for automobiles comprising a driven shaft having a plurality of recesses circumferentially formed therein, a concentric driving shaft surrounding said driven shaft and having a plurality of openings circumferentially arranged corresponding to said recesses, a sleeve surrounding a section of said driving shaft and covering said openings, said sleeve having formed upon its inner surface two separate opposed gently sloping conical shaped sections, a centrally located cylindrical section joining the bases of said conical shaped sections, and a groove located adjacent each end of said sleeve, the inner edge of each groove being spaced outwardly an amount slightly greater than the outer edge thereof, and a plurality of balls located, during said normally disengaged position of the clutch, between said centrally located cylindrical sections and said openings, and adapted upon translatory motion of said sleeve in either direction to be smoothly uniformly and gradually transmitted by means of said conical sections through said openings into said recesses and held firmly therein by one of said groves whereby the clutch is engaged.

NATHAN FRANK.